United States Patent [19]
Kemp et al.

[11] Patent Number: 5,734,248
[45] Date of Patent: Mar. 31, 1998

[54] CURRENT MODULATION MOTOR CONTROLLER

[75] Inventors: William Harry Kemp, Clayton; Victor Joseph Shideler, Carleton, both of Canada

[73] Assignee: Sequence Controls Inc., Ontario, Canada

[21] Appl. No.: 870,677

[22] Filed: Jun. 6, 1997

Related U.S. Application Data

[63] Continuation-in-part of Ser. No. 565,173, Nov. 30, 1995, abandoned.
[51] Int. Cl.$^6$ .......................................................... H02P 7/36
[52] U.S. Cl. ........................... 318/772; 318/779; 318/781; 318/809
[58] Field of Search .................................. 318/729, 749, 318/751, 756, 767, 772, 778, 779, 781, 799, 800, 807, 809, 811

[56] References Cited

U.S. PATENT DOCUMENTS

4,520,303  5/1985  Ward ........................................ 318/778
5,333,474  8/1994  Imai et al. ............................ 318/754 X
5,483,139  1/1996  Welles, II ................................. 318/782

*Primary Examiner*—Bentsu Ro
*Attorney, Agent, or Firm*—William L. Feeney; Kerkam, Stowell, Kondracki & Clarke, P.C.

[57] ABSTRACT

An apparatus for controlling the speed of an induction motor includes a first winding and a second winding. The first winding and second winding are adapted to be coupled to an AC source for supplying an AC input signal. A first switching device is coupled to the first winding and a second switching device is coupled to the second winding. Each of the switching devices is operative in a low impedance state enabling current to flow through the associated winding of each switching device and a high impedance state preventing significant current flow through the associated winding of each switching device. A controller switches each of the switching devices from the high impedance state to the low impedance state in a sequence for controlling the current in the windings, which induces a phase shift between the AC voltages across the windings.

22 Claims, 11 Drawing Sheets

CURRENT MODULATION MOTOR CONTROLLER

This is a continuation-in-part of application Ser. No. 08/565,173, filed Nov. 30, 1995, now abandoned.

BACKGROUND OF THE INVENTION

1. Field of the Invention

The present invention relates generally to electrical motors and associated methods of speed control. More particularly, the present invention relates to a controller that employs current modulation which operates to optimize the performance of an induction motor at variable speeds.

2. Description of the Prior Art

Variable speed electrical motors and controllers are available and well known in the art. Variable speed electrical motors often employ controllers that employ such methods as mechanical gearing, inverter or voltage control.

The prior art mechanical gearing methods typically employ gearing systems that reduce the output speed of a motor shaft. Often such mechanical gearing systems are adjustable to allow the motor to be operated at various speeds. The mechanical speed controls are often not used due to large size, high cost and difficult control methods.

The prior art inverter methods are well known and utilized in the art. The inverter method employs an inverter that converts a DC input into a six step current waveform that is applied to the motor. This method is used primarily in high end applications.

Prior art voltage control methods vary the speed of electric motors by varying the AC input. The speed variation is accomplished either by varying the voltage or the phase angle of the AC input that drives the motors. Employing the voltage control method is relatively low in cost, but requires the motor to rotate at a high rate of speed. This makes these types of motors noisy and having a lower life expectancy due to brush wear on the commutator shaft of the motor. The voltage control method is exemplified by U.S. Pat. No. 4,099,108 to Okawa et al., entitled VARIABLE SPEED CONTROL APPARATUS FOR INDUCTION MOTOR, issued on Jul. 4, 1978 and U.S. Pat. No. 5,111,374 to Lai et al., entitled HIGH FREQUENCY QUAS-RESONANT DC VOLTAGE NOTCHING SCHEME OF A PWM VOLTAGE FED INVERTER FOR AC MOTOR DRIVES, issued on May 5, 1992.

One common type of prior art variable speed motor that employs the voltage control method, is a split phase capacitor motor, which is known in the art as a PCS motor. PCS motors are typically employed in small load applications which do not require high start/running torque.

A drawback with PCS motors is that they require components such as capacitors and centrifugal switches for generating the necessary torque to drive such motors. These components make these motors more costly and difficult to design. Also, another drawback with the PCS motors is that they can only be operated at a limited range of speeds. This is caused by PCS motors having a limited "slip range". The "slip factor" of a motor is the quantity that expresses how far below the synchronous speed a motor can be driven. The synchronous speed is the full rotational speed of the motor, which is proportional to the AC frequency input.

An object of the present invention is to provide an improved induction motor speed controller.

A further object of the present invention is to provide an induction motor speed controller that does not utilize capacitors and centrifugal switches.

A further object of the present invention is to provide a controller that enables an induction motor to have a wider "slip range", thereby allowing the motor to be operated at a wider range of speeds.

A further object of the present invention is to provide an improved method for controlling the speed of an induction motor.

SUMMARY OF THE INVENTION

According to the invention, there is provided an apparatus for controlling the speed of an induction motor, the motor having a first winding and a second winding which are adapted to be coupled to an AC source for supplying an AC input signal, the apparatus comprising: a first switching device coupled to the first winding and a second switching device coupled to the second winding, each of the switching devices being operative in a low impedance state thereby enabling current to flow through the associated winding of each switching device and a high impedance state thereby preventing significant current flow through the associated winding of each switching device; and a controller means for switching each switching device between its high and low impedance states in a sequence for inducing a phase shift between voltage signals of the first winding and the second winding.

In an embodiment of the invention, there is provided an apparatus for controlling the speed of an induction motor, the motor having a first winding and a second winding which are adapted to be coupled to an AC source for supplying an AC input signal, the apparatus comprising: a first switching device coupled to the first winding and a second switching device coupled to the second winding, each of the switching devices being operative in a low impedance state thereby enabling current to flow through the associated winding of each switching device and a high impedance state thereby preventing significant current flow through the associated winding of each switching device; and a controller means for switching each switching device between its high and low impedance states in a sequence for inducing a phase shift between voltage signals of the first winding and the second winding; wherein the first and second switching devices comprise first and second respective triacs, and wherein the first triac is connected in series with the first winding and has a first gate input connected to the controller means, and the second triac is connected in series with the second winding and has a second gate input connected to the controller means.

According to the invention, there is further provided a method for controlling the speed of an induction motor, the motor having a first winding and a second winding which are adapted to be coupled to an AC source for supplying an AC input signal, the method comprising the steps of: detecting a first zero crossing point of the AC input signal; generating first and second delays measured from the first zero crossing point of the AC input signal; after the first delay has occurred, switching on the first winding enabling current to flow through the first winding; after the second delay has occurred, switching on the second winding enabling current to flow through the second winding; detecting a second zero crossing point of the AC input signal; and switching off the first and the second windings thereby preventing significant current flow through the first and second windings.

According to the invention, there is further provided a method for controlling the speed of an induction motor, the motor having a first winding and a second winding which are adapted to be coupled to an AC source for supplying an AC input signal, the method comprising the steps of:

I.
a)
  i. detecting a first zero crossing point of the AC input signal;
  ii. generating a first delay; and
  iii. after the first delay has occurred, switching on the first winding enabling current to flow through the first winding; and simultaneously
b)
  i. detecting a first zero crossing point of the voltage signal across the second winding;
  ii. generating a second delay; and
  iii. switching on the second winding enabling current to flow through the second winding; and then II.
a)
  i. detecting a second zero crossing point of the AC input signal; and
  ii. switching off the first winding thereby preventing significant current flow through the first winding; and simultaneously
b)
  i. detecting a second zero crossing point of the voltage signal across the second winding; and
  ii. switching off the second winding thereby preventing significant current flow through the second winding.

Other advantages, objects and features of the present invention will be readily apparent to those skilled in the art from a review of the following detailed description of the preferred embodiment in conjunction with the accompanying drawings and claims.

BRIEF DESCRIPTION OF THE DRAWINGS

The embodiments of the invention will now be described with reference to the accompanying drawings, in which.

DETAILED DESCRIPTION OF THE INVENTION

Figure 1:
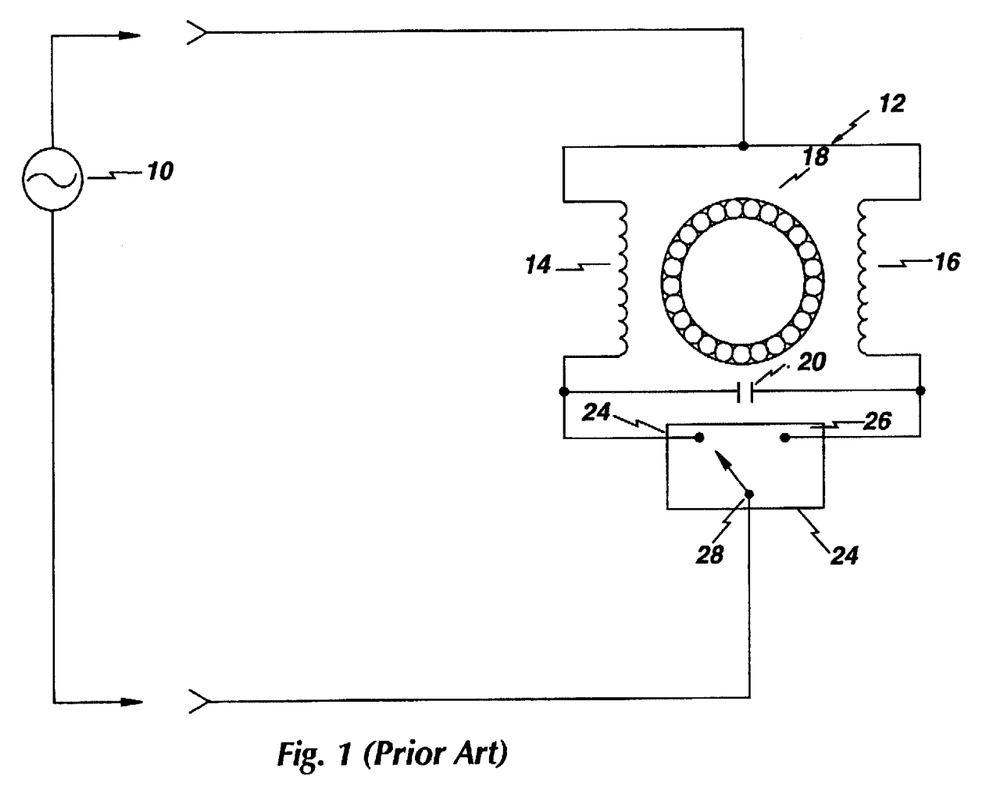
FIG. 1 is a schematic of the prior art PCS motor.

Referring to FIG. 1, there is shown an embodiment of a prior art PCS motor 12. The motor 12 includes two stator windings 14, 16 and a rotor 18. Both windings 14, 16 may be of equal inductance and resistance, which makes them both "running" windings. One side of each of the windings 14, 16 are coupled to one side of an AC source 10, while a capacitor 20 is coupled across the other side of the windings 14, 16. A switch 22 is also included in the assembly and includes two output terminals 24, 26 and an input terminal 28. Each of the two output terminals 24, 26 is coupled to one side of the capacitor 20, while the input terminal 28 is coupled to the other side of the AC source 10.

The switch 22 being placed in the position as shown applies the AC source 10 to the motor 12 and also places the capacitor 20 in series with winding 16. This causes the AC source 10 to be applied across both of the windings 14, 16. The capacitor 20 induces a phase shift between the voltages across each of the windings 14, 16. The phase shift creates a pseudo two phase voltage across the windings 14, 16. The two phase voltage generates a rotating magnetic field within the motor 12 that provides the necessary torque to start turning the rotor 18 in the specified direction. If capacitor 20 was taken out of the circuit, the motor 12 would not start because there would be no rotating magnetic field to generate the necessary torque to start turning the rotor 18. The switch 22 being placed in the position where input terminal 28 is coupled to output terminal 26, places the capacitor 20 in series with winding 14. This position of the switch 22 enables the direction of the motor 12 to be reversed.

The value of the capacitor 20 is selected to provide a large enough "start current" to start the rotor 18 rotating. The capacitor 20 must also be of a value sufficient to supply an optimum "running current", which ensures the motor 12 runs efficiently at full speed. This can be a problem because very often no one capacitor can supply a current suitable for both starting and running situations. The amount of "start current" required very often is large, which potentially can damage the motor 12 when running at full speed. In order to overcome this problem, a second capacitor 24 can be placed in parallel with capacitor 20 as shown in FIG. 2.

Figure 2:
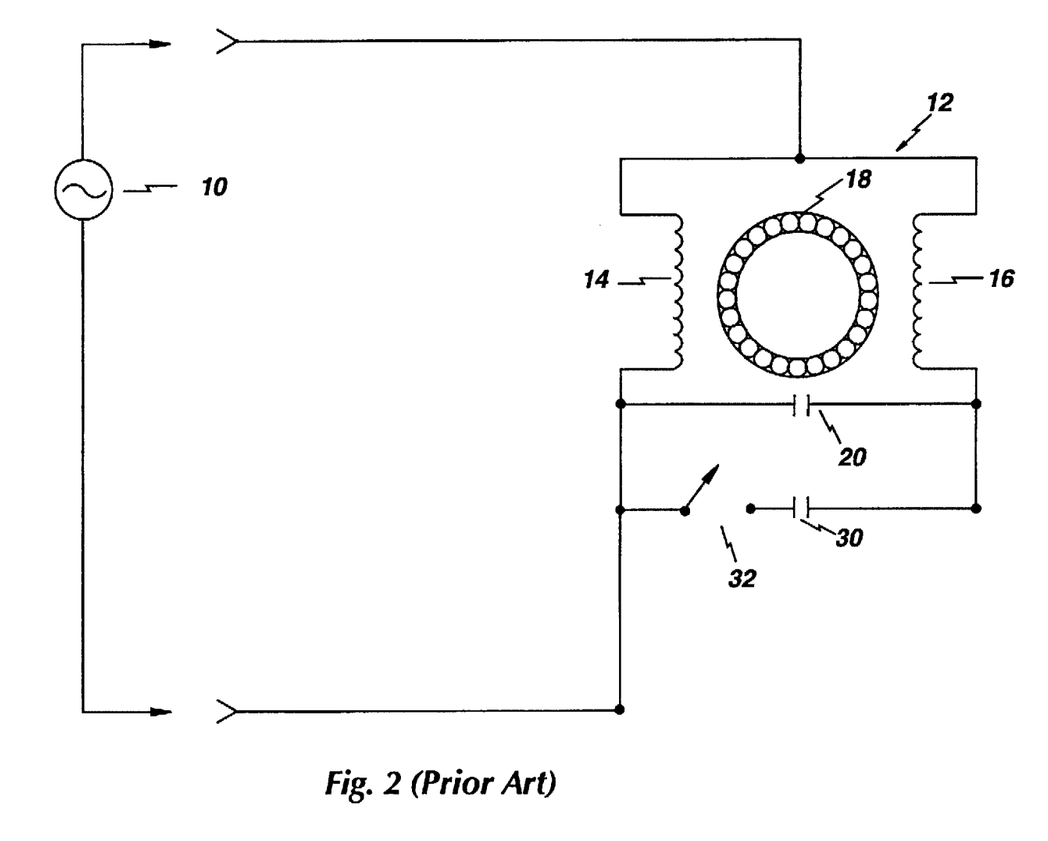
FIG. 2 is a schematic of the prior art PCS motor with dual capacitors.

Referring to FIG. 2, there is shown a second embodiment of a prior art PCS motor 12. In this embodiment, the motor 12 includes a running capacitor 20 coupled across a series coupled centrifugal switch 32 and start capacitor 30. When the motor 12 is starting, the switch 32 is closed placing the running capacitor 20 and start capacitor 30 in parallel. Such a configuration allows the motor 12 to receive a high starting current and torque when the AC input 10 is applied. Once the motor 12 nears operational speed, the centrifugal switch 32 opens removing the start capacitor 30. At this time the running capacitor 20 is left in the circuit providing an optimum "running current" that wold not damage the motor 12.

The use of capacitors and switches is a drawback with the prior art PCS motors shown in FIG. 1 and FIG. 2. Adding such components increases the cost and weight of the motors. Also, the capacitors make the design of a speed controller for the motors more difficult because the designer must work within the limits imposed by the capacitors or the centrifugal switch.

The prior art PCS motors can be made to run at variable speeds by varying the phase angle applied to the two motor windings. The speed of the motors can be reduced below synchronous speed due to the increased "slip factor". The increased "slip factor" can be accomplished by utilizing selected taps of an external auto transformer, internal to the windings or by phase angle delay of the applied signal.

Another drawback with PCS motors is that they have a limited "slip range", which limits the range of speeds the motor can be operated. The "slip range" is limited because the phase angle difference is achieved by varying the phase of one of the windings with respect to the AC input. As will be discussed later, a wider phase angle difference can be achieved, by varying the phase of both of the windings with respect to the AC input, thus providing a wider "slip range". A wider "slip range" enables such motors to run at a wider range of speeds.

Figure 3:
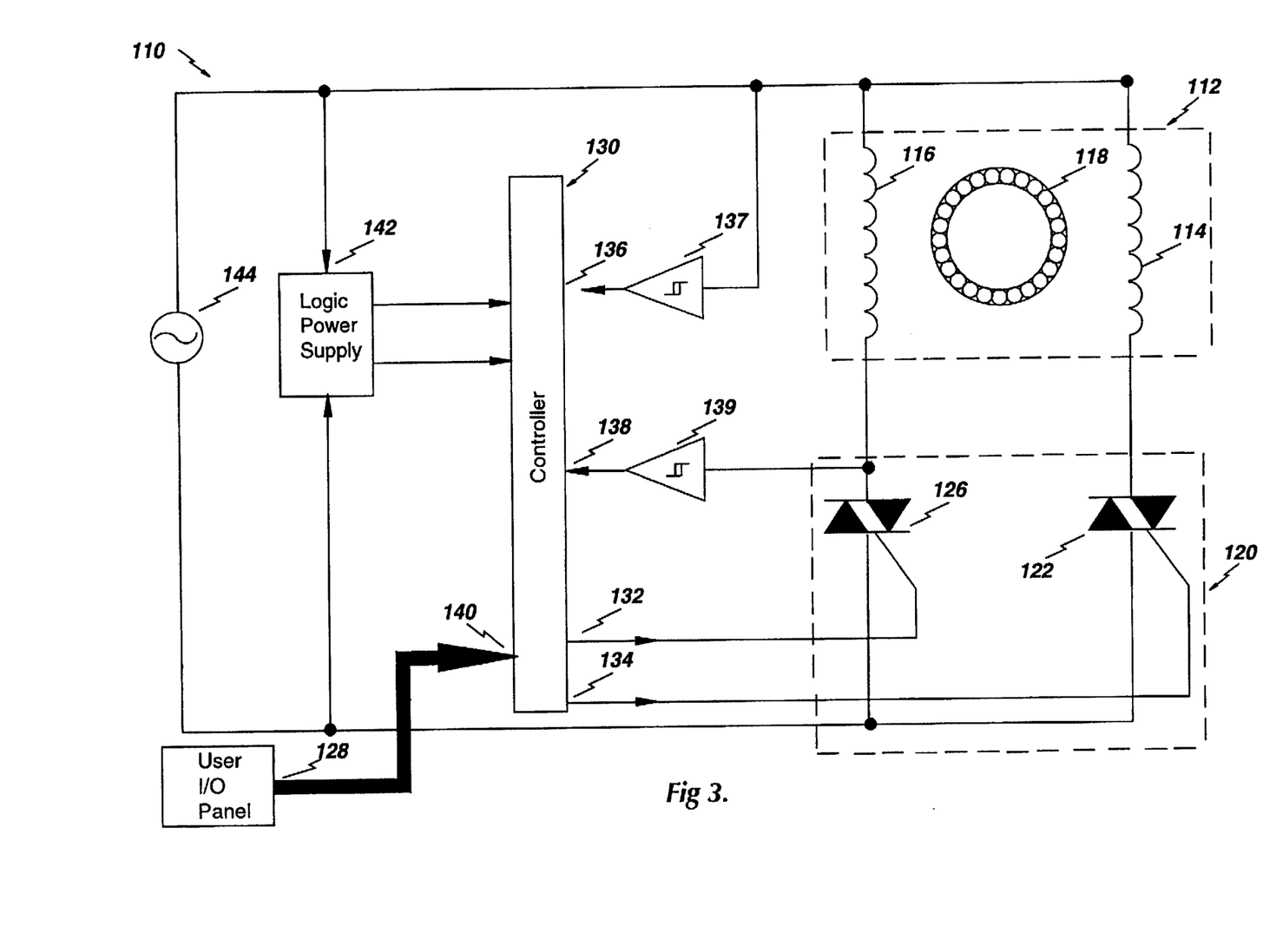
FIG. 3 is a schematic of one preferred embodiment of the current modulation motor controller of the present invention.

Now referring to FIG. 3, there is shown an embodiment of the current modulation motor controller 110. An advantage of the controller 110 is that it does not require the use of capacitors to induce a phase shift between the motor winding voltages. As discussed earlier, a phase shift is necessary in order to develop the necessary torque to start and drive such motors. The present invention induces the phase shift by a current modulating technique, which is implemented by a controller 130, which is preferably a microcontroller.

The current modulation motor controller 110 includes an induction motor 112 that has a run winding 114, a start winding 116 and a rotor 118. One side of both the run winding 114 and start winding 116 is coupled to an AC source 144. The AC source 144 provides an AC input signal that actually drives the motor 112. At full speed the motor 112 turns at a rate proportional to the frequency of the AC input signal, which is known in the art as the synchronous speed.

A run triac 122 is coupled between the other side of the run winding 114 and the other side of the AC source 144. Similarly a start triac 126 is coupled between the other side of the start winding 116 and the other side of the AC source 144. Each of the triacs 122, 126 has a gate input that enables them to be individually switched from a state of high impedance to a state of low impedance. The triacs 122, 126 are utilized for controlling the current that flows through the windings 114, 116 by being switched between the state of high and low impedance. In the state of high impedance no significant amount of current will flow, while in the state of low impedance current will flow in the windings 114, 116. Utilizing triacs 122, 126 is a preferred method for controlling the current through the windings 114, 116. Alternatively, this function can be accomplished by utilizing SCR's, FET transistors or other types of switching devices.

A controller 130 is coupled to each of the triacs 122, 126. The controller 130 has a first output 132 that is connected to the gate input of the start triac 126 and a second output 134 that is similarly connected to the gate input of the run triac 122. The controller 130 develops signals at the first output 132 and the second output 134 for switching the triacs 122, 126 between the states of high and low impedance. By selectively switching the run triac 122 and start triac 126, the controller 130 can modulate the currents within the windings 114, 116.

The controller 130 also includes a first input 136 and a second input 138. The first input 136 is connected to the AC input 144 through a buffer 137. The first input 136 enables the controller 130 to monitor the AC input 144. The second input 138 is connected across the starting winding 116 through a buffer 139. The second input 138 allows the controller 130 to monitor the voltage signal across the start winding 116. The two buffers 137, 139 further isolate the controller 130 from any affects of the motor winding inductance.

The controller 130 has a user input 140, which is connected to a user I/O 128. The user I/O 128, which is usually embodied as a panel of switches, enables a user to interface with the controller 130. The controller 130 has another input that is coupled to a logic power supply 142, which in turn is coupled across the AC source 144. The logic power supply 142 converts the AC power from the AC source into a DC voltage that can be utilized as a logic level by the controller 130 and other DC devices.

During operation, the controller 130 controls the motor 112 by modulating the currents within both windings 114, 116. The controller 130 modulates the currents by developing signals at both of the outputs 132, 134, which switches the triacs 122, 126 at specified times. The timing of the signals developed at both outputs 132, 134 will differ depending on the mode of operation of the motor 112, which includes a starting, a full speed and a variable speed mode.

Figure 4:
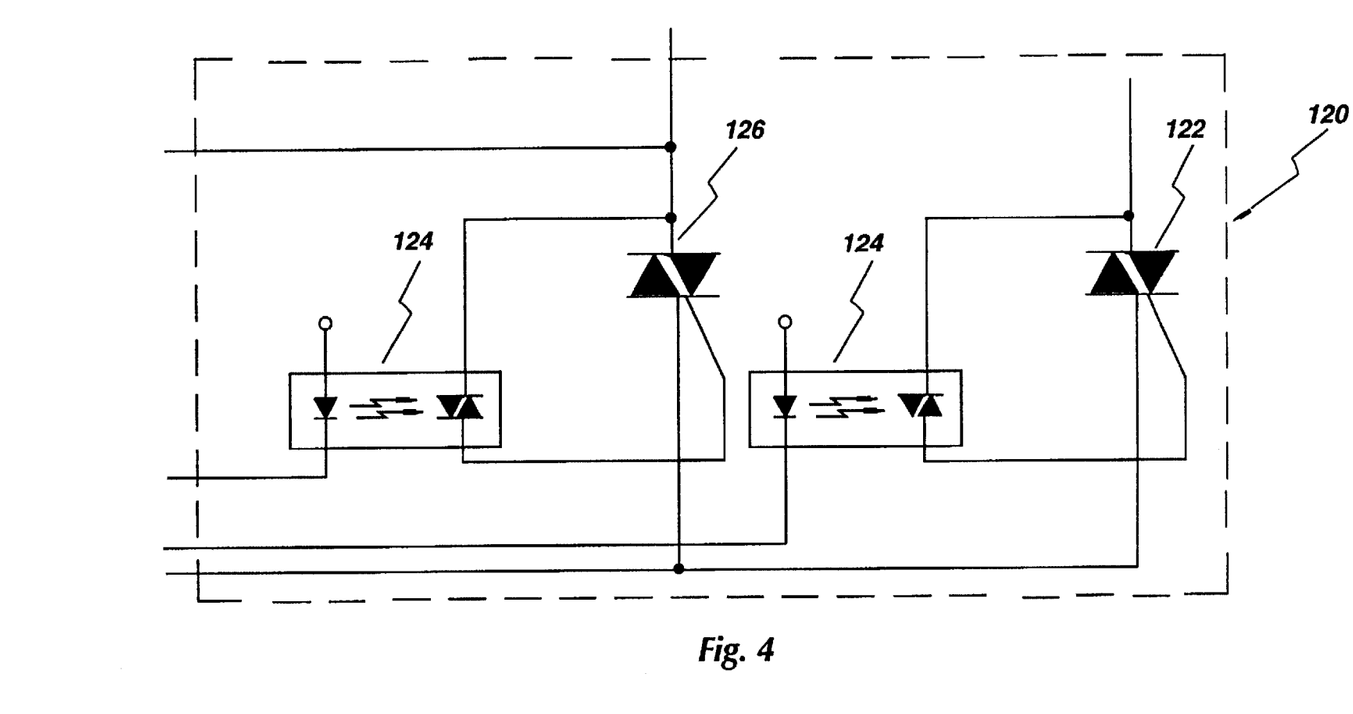
FIG. 4 is a preferred method for coupling the gate inputs of the triacs to the controller of the present invention.

Referring to FIG. 4, there is shown a preferred embodiment for coupling the gate inputs of the triacs 122, 126 to the controller 130. FIG. 4 replaces the boxed in section 120 of FIG. 3. In the preferred embodiment the gates of the start triac 126 and the run triac 122 are each connected to the controller 130 through an optical coupler 124. The two optical couplers 124 serve to isolate the controller from any potentially damaging effects of the motor winding inductance.

Figure 5:
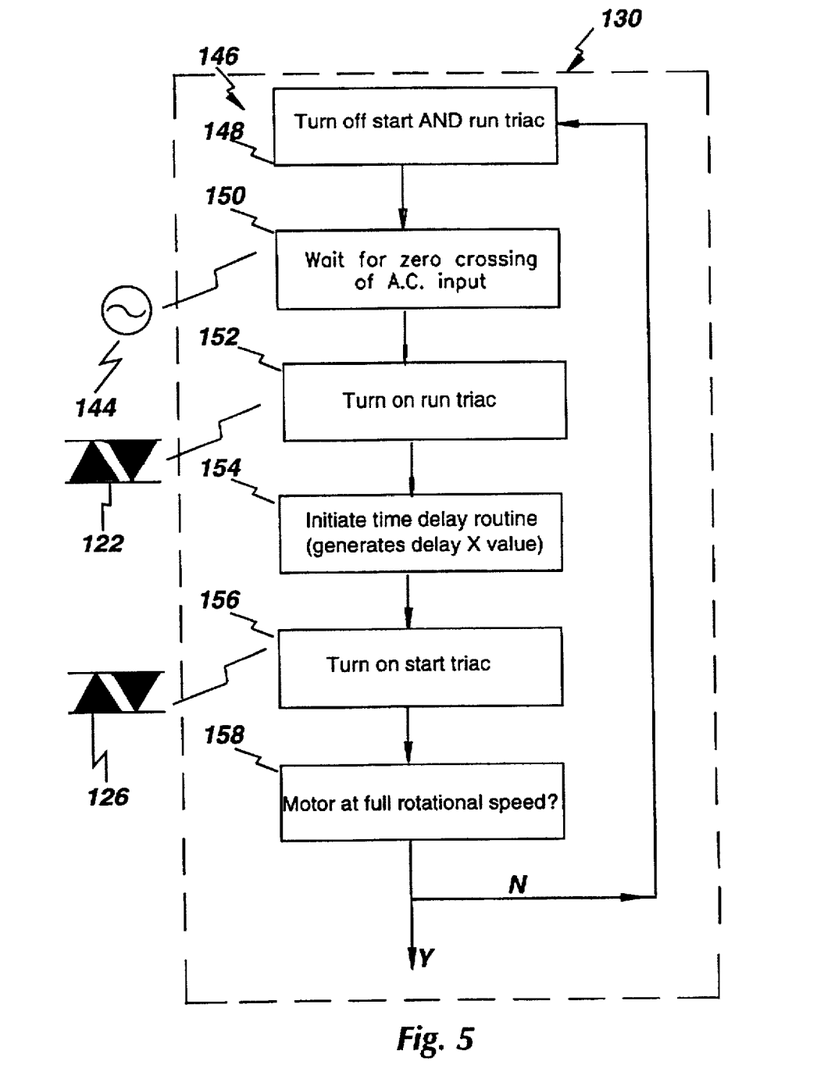
FIG. 5 is a flow chart illustrating the starting mode sequence of the controller of the present invention.

Referring to FIG. 5, a flow chart of a starting mode sequence 146 of the controller 130 is shown. The starting mode sequence 146 consists of a loop executed every half cycle of the AC input provided by the AC source 144. The starting mode sequence 146 begins in a TURN OFF START AND RUN TRIAC step 148, which causes the controller 130 to send signals to the gate inputs of the triacs 122, 126 ensuring that they are in the off state. Ensuring both triacs 122, 126 are in the off state enables the starting mode sequence 146 to be initiated at any synchronous time with respect to the AC input. After the triacs are shut off, a WAIT FOR ZERO CROSSING OF AC INPUT step 150 will be executed.

In the WAIT FOR ZERO CROSSING OF AC INPUT step 150, the controller 130 will monitor the AC input signal. The controller 130 will not advance to the next step until a zero crossing of the AC input is detected. Thus, the run triac 122 is only turned on at the beginning of each half cycle of the AC input 144, which is at the zero crossing. Turning the run triac 122 on at this time ensures that maximum power will be applied to the run winding 114 because it will conduct for the full half cycle of the AC input 144. After the zero crossing is detected, a TURN ON RUN TRIAC step 152 will be executed. A signal will be generated at the second output 134 that will be felt at the gate input of the run triac 122, thereby turning it on. This will energize the run winding 114 generating a magnetic field within the motor 112. The magnetic field generated at this time is not rotating, which cannot generate sufficient torque to start the motor 112. After the run triac 122 is turned on, an INITIATE TIME DELAY ROUTINE step 154 will be executed.

In the INITIATE TIME DELAY ROUTINE step 154, a Delay X Value will be generated that will correspond to the amount of electrical degrees before the start triac 126 is turned on. This delay is necessary in order to induce a phase shift between the start winding 116 and the run winding 114 voltages, which will supply the necessary torque to start the motor 112. As discussed earlier, the prior art PCS motors generate the phase shift by components such as capacitors. An advantage of the present invention is that the use of such components is eliminated.

The Delay X Value generated can be a fixed or variable. The value of the delay will correspond to the level of starting torque the motor 112 will have. For the proper amount of torque to be generated, the delay should be no less than ninety degrees. The delay can be greater than ninety degrees, but this will reduce the starting torque in a motor from the maximum at ninety degrees. A delay value of ninety degrees will generate the maximum starting torque because the maximum amount of current will flow in the start winding 116 at ninety degrees, which is the peak value of the AC input.

After the delay value is generated, a TURN ON START TRIAC step 156 is executed. A signal will be generated at the first output 132 that will be felt at the gate input of the start triac 126, thereby turning it on. This will energize the start winding 116 creating a rotating magnetic field within the motor 112 sufficient to start it rotating.

After the start triac 126 is turned on, a MOTOR AT FULL ROTATIONAL SPEED step 158 is executed. In this step, the controller 130 will see if the motor 112 has reached its full speed. The rotational speed of the motor 112 can be determined by a fixed time or an external input. If full rotational speed has not been reached, the controller 130 will loop back to the beginning of the sequence 146. The start mode sequence 146 will be repeated until full rotational speed is attained. When full rotational speed is attained, the controller 130 will leave the sequence 146.

Figure 6:
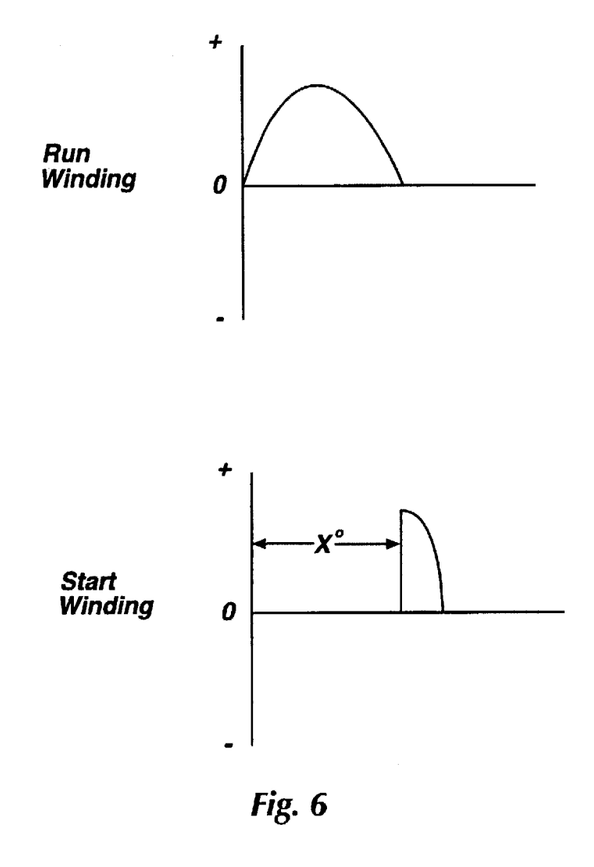
FIG. 6 is a wave form diagram of the voltage signal across the motor windings when in the starting mode of the present invention.

Referring to FIG. 6, there is shown a voltage signal generated across each of the windings in the start mode. As you can see the run winding is energized for the full half cycle of the AC input, while the start winding is only energized after delaying X Degrees. The value of Delay X will correspond to the number of degrees the phase angle of the start winding will be out of phase with the run winding.

Figure 7:
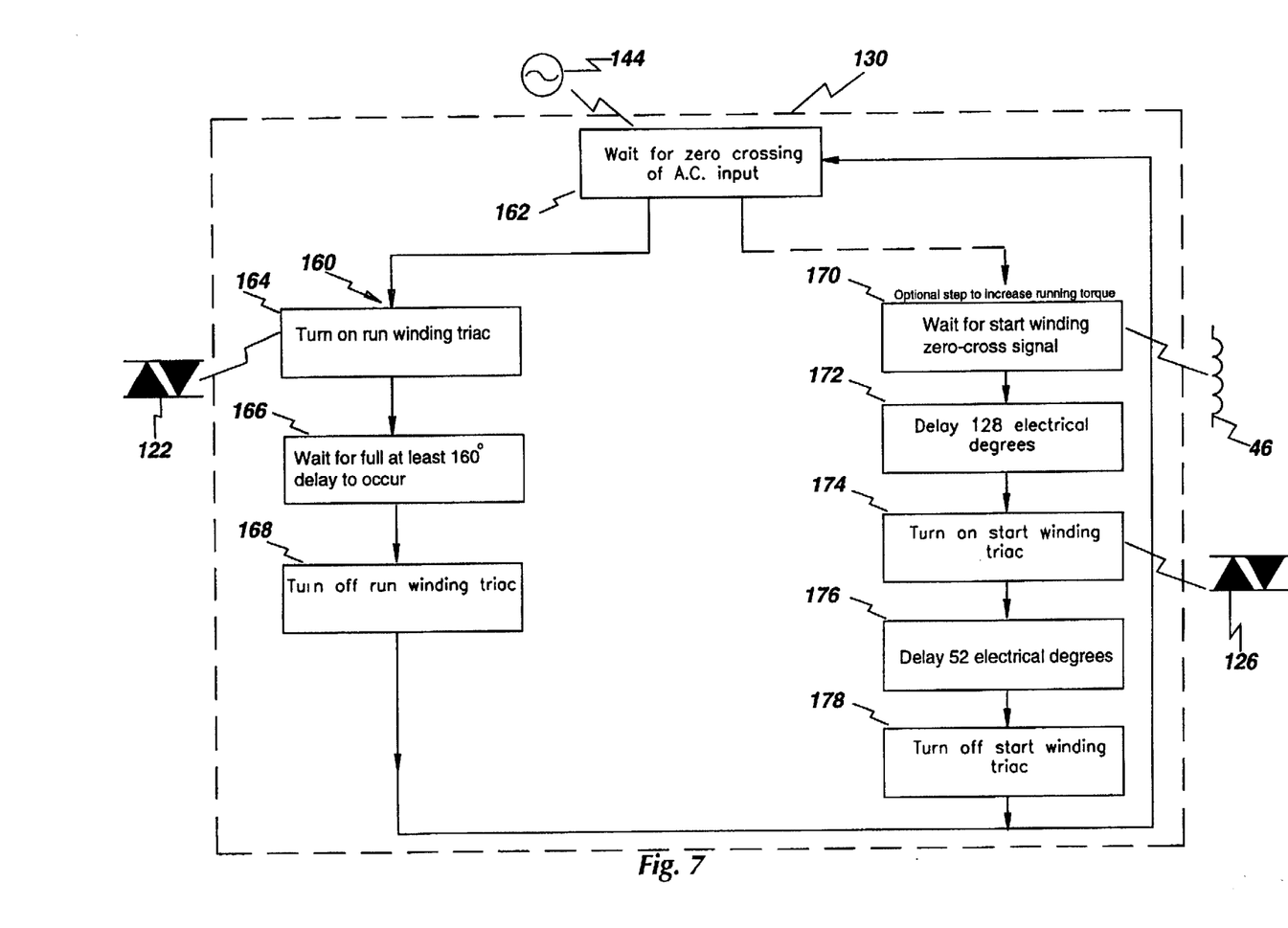
FIG. 7 is a flow chart illustrating the full speed mode sequence of the controller of the present invention.

Referring to FIG. 7, there is shown a flow diagram of a full speed sequence of the controller 130. The sequence 160 consists of a loop executed every half cycle of the AC input. The full speed mode sequence 160 assumes that the start mode sequence 146 has been completed. The full speed mode sequence 160 starts in a WAIT FOR ZERO CROSSING OF AC INPUT step 162. In this step, the controller 130 will monitor the AC input signal at its first input 136 (FIG. 3). The controller 130 will not advance to the next step until a zero crossing of the AC input 144 is detected. When the zero point crossing of the AC input 144 is detected, the controller 130 will then advance to the next step. At this point the sequence 160 splits into a left and right branch as shown. The left branch can be executed by itself or simultaneously with the right branch.

When the left branch is executed by itself, a TURN ON RUN WINDING TRIAC step 164 is executed next. In this step, the run winding 114 is energized generating a magnetic field within the motor 112. Because the motor 112 is already rotating, the magnetic field generated from just the run winding will be sufficient to continue to drive the motor 112. After the run triac 122 is turned on, a WAIT FOR AT LEAST 160 DEGREE DELAY TO OCCUR step 166 is executed. In this step, the controller 130 will wait at least 160 degrees or near half cycle of the AC input before advancing to the next step. This ensures that maximum power is applied to the run winding 114 due to it being energized for the full or near full half cycle. The run winding 114 may still be energized after the run triac 122 is shut off due to transients developed therein. This is the reason why the run triac 122 is shut off between 160 and 180 degrees. After the delay, the controller 130 will then execute a TURN OFF RUN WINDING TRIAC step 168 where the run triac 122 will be turned off.

As discussed above, energizing just the run winding 114 is sufficient to drive the motor 112 in the full speed mode, but some applications might require a larger running torque. If this is the case, then the right branch can be executed simultaneously with the left branch in a time shared mode.

When both branches are executing simultaneously a WAIT FOR START WINDING ZERO CROSS SIGNAL step 170 will also be executed at the zero crossing of the AC input signal. In this step, the controller 130 will monitor the signal across the start winding 116, which is out of phase with respect to the voltage of the AC input 144.

At this point even though the start winding 116 is not energized, there will be a voltage across the start winding 116. When the signal across the start winding 116 reaches the zero crossing, the controller 130 will then execute a DELAY 128 ELECTRICAL DEGREES step 172. In this step, the controller 130 will wait for 128 degrees of the half cycle before advancing to the next step.

After the 128 degree delay, the controller 130 will then execute a TURN ON START WINDING TRIAC step 174. In this step, the start winding 116 will be energized along with the already energized run winding 114. This will provide a larger torque for driving the motor 112 in the full speed mode. The larger torque is generated because energizing the start winding 116 after the delay induces a phase shift between the two windings, which generates the larger magnetic field within the motor 112. This delay serves the same function as a running capacitor of the PCS motor of FIG. 2. The value of the delay is 128 degrees because in a given motor, optimum running conditions were achieved with this value.

After the start triac 126 is turned on, a DELAY 52 ELECTRICAL DEGREES step 176 will be executed. In this step, the controller 130 will wait fifty-two degrees before turning off the start triac 126. After the fifty-two degree delay, a TURN OFF START WINDING TRIAC step 178 will be executed where the start triac 126 will be turned off.

After the start triac 126 is turned off, the controller 130 will loop back to the beginning of the sequence 160 if the motor continues to run in the full speed mode. If during operation it is desired to reduce the speed of the motor 112, then the controller 130 will initiate the variable speed sequence.

Figure 8:
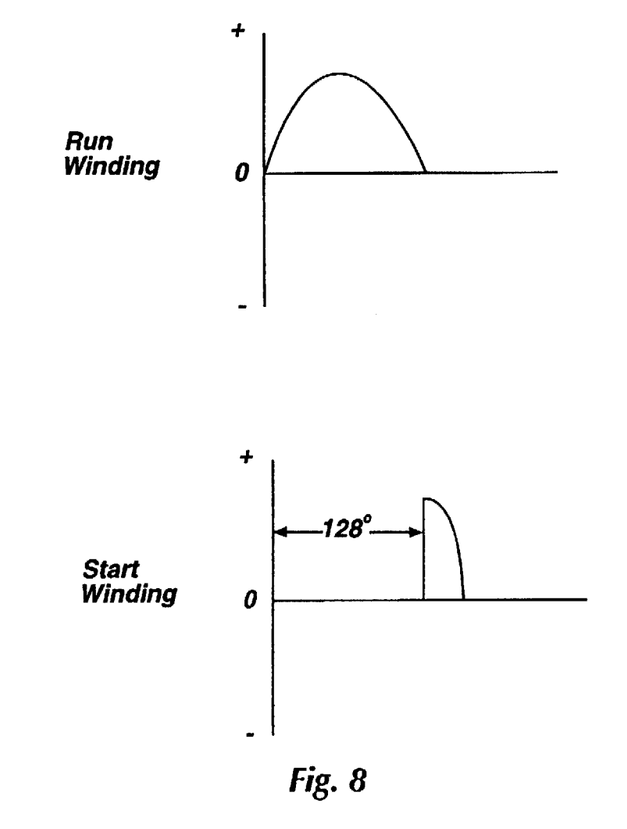
FIG. 8 is a wave form diagram of the voltage signal across the motor windings when in the full speed mode of the present invention.

Referring to FIG. 8, there is shown a voltage signal generated across each of the windings in the full speed mode. As you can see the run winding is energized for the full half cycle of the AC input, while the start winding is only energized after a delay of 128 degrees. The 128 degree delay will cause the voltage across the start winding to be out of phase with the run winding.

Figure 9:
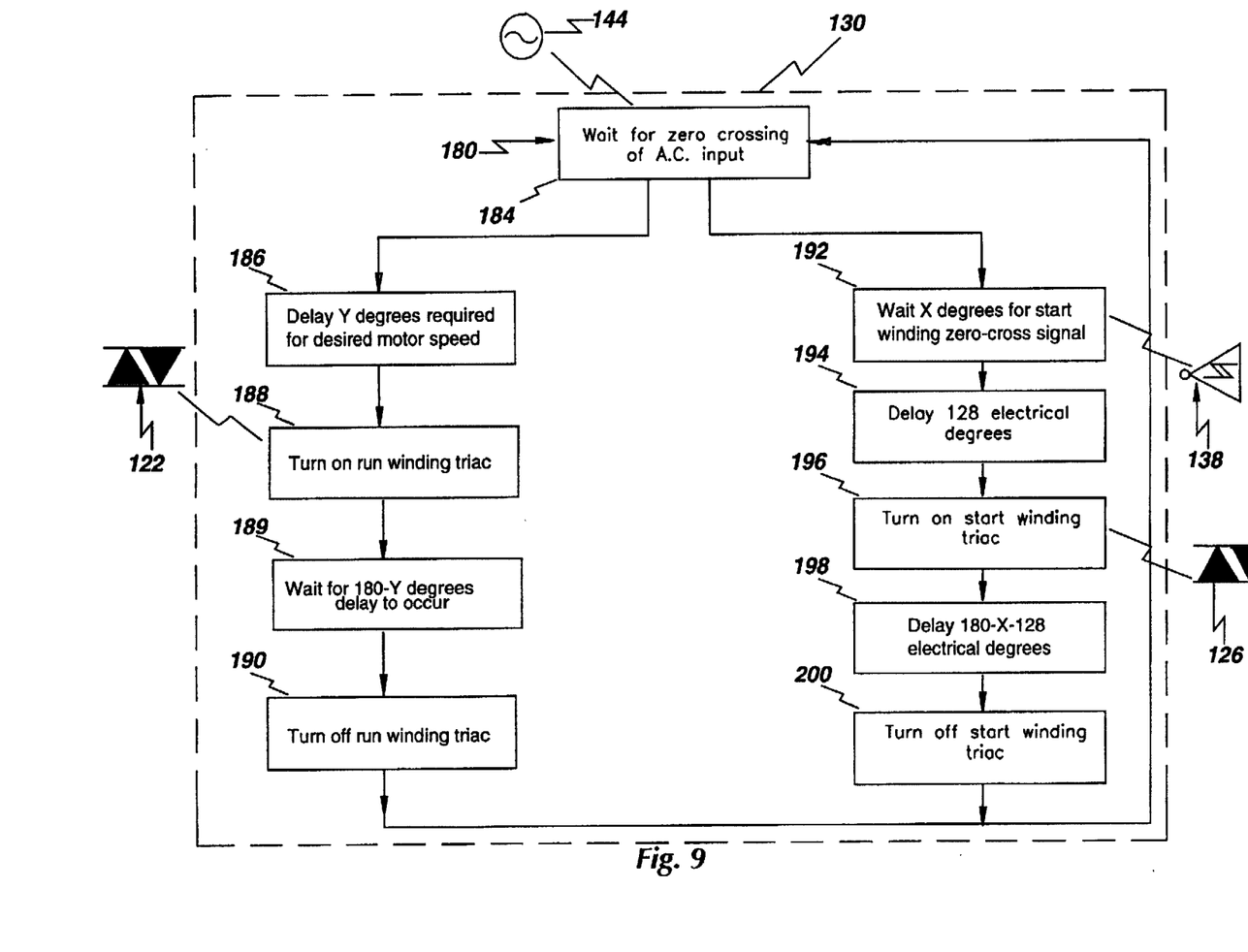
FIG. 9 is a flow chart illustrating a variable speed mode sequence of the controller of the present invention.

Referring to FIG. 9, there is shown a flow diagram of a variable speed mode sequence 180 of the controller 130. The sequence 180 consists of a loop executed every half cycle of the AC input. The sequence 180 assumes the full speed mode sequence 160 is currently executing. The variable speed mode sequence 180 starts in a WAIT FOR ZERO CROSSING OF AC INPUT step 184. In this step, the controller 130 will monitor the AC input signal at its first input 136 (see FIG. 3). The controller 130 will not advance to the next step until a zero crossing of the AC input 144 is detected. When the zero crossing point of the AC input 144 is detected, the controller 130 will then advance to the next step. At this point the sequence 180 splits into left and right branches as shown. The left branch will be executed simultaneously with the right branch in a time shared mode.

Referring to the left branch, a DELAY Y DEGREES REQUIRED FOR DESIRED MOTOR SPEED step 186 is executed next. In this step, the run winding 114 is left de-energized for Y degrees from AC mains zero crossing. Next, a TURN ON RUN WINDING TRIAC step 188 is executed. This delay in energizing the run winding will weaken the magnetic field within the motor 112. After the run triac 122 is turned on, a WAIT FOR 180-Y DEGREES DELAY TO OCCUR step 189 is executed. After the delay, the controller 130 will then execute a TURN OFF RUN WINDING TRIAC step 190. The run winding 114 may still be energized after the run triac 122 is shut off due to transients developed therein.

Referring to the right branch, a WAIT X DEGREES FOR START WINDING ZERO-CROSS SIGNAL step 192 will be executed at the zero crossing of the second input 138, i.e. the start winding reference input. In this step, the controller 130 will monitor the voltage signal across the start winding 116, which is out of phase with respect to the voltage of the AC input 144. At this point, even though the start winding 116 is not energized, there will be a voltage across the start winding 116. When the signal across the start winding 116 reaches the zero crossing, the controller 130 will then execute a DELAY 128 ELECTRICAL DEGREES step 194. In this step, the controller 130 will wait for 128 degrees of the half cycle before advancing to the next step.

After the 128 degree delay, the controller 130 will then execute a TURN ON START WINDING TRIAC step 196. In this step, the start winding 116 will be energized along with the already energized run winding 114.

After the start triac 126 is turned on, a DELAY 180-X-128 ELECTRICAL DEGREES step 198 will be executed. In this step, the controller 130 will wait 180-X-128 electrical degrees before turning off the start triac 126. After the 180-X-128 delay, a TURNOFF START WINDING TRIAC step 200 will be executed where the start triac 126 will be turned off. Note that those skilled in the art will realize that the value of X must be less than or equal to fifty-two degrees in this particular embodiment.

After the start triac 126 is turned off, the controller 130 will loop back to the beginning of the sequence 180 if the motor continues to run in the variable speed mode. If the motor 112 is to be maintained at the same speed, the same value of DELAY Y will be generated when re-executing the loop. If the motor speed is again changed, then the controller will generate a new value of DELAY Y. If during operation it is desired to operate the motor 112 at full speed, then the controller 130 will initiate the full speed sequence 160. Stopping the motor is accomplished by turning off both the start triac 126 and the run triac 122 simultaneously.

The above steps alter the magnetic field within the motor, by modulating the currents within the windings so that the phase of each winding has a different phase angle with respect to the AC input signal. This will generate a phase difference between the run winding 122 and start winding 126 that will enhance the motor slip, which will allow the motor 112 to be operated at a wider range of speeds. As discussed earlier, the prior art PCS motors reduce motor speed by varying the applied voltage equally to the windings which greatly limits the range of slip. Additionally, the above steps enable the motor slip to be further enhanced by varying the phase difference of the start winding 116 with respect to the AC input signal, which cannot be accomplished by using a capacitor.

Figure 10:
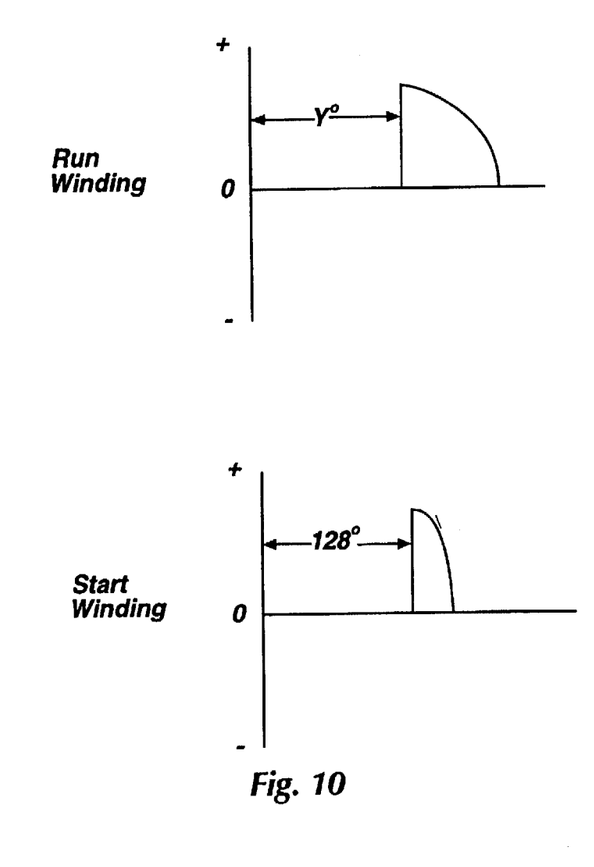
FIG. 10 is a wave form diagram of the voltage signal across the motor windings when in the variable speed mode of the present invention.

Now referring to FIG. 10, there is shown a voltage signal generated across each of the windings in the variable speed mode. As you can see, both the run windings and start windings are turned on at their respective delay times. These delay times will provide the proper phase shifts within each of the windings to increase the slip range of the motor.

Figure 11:
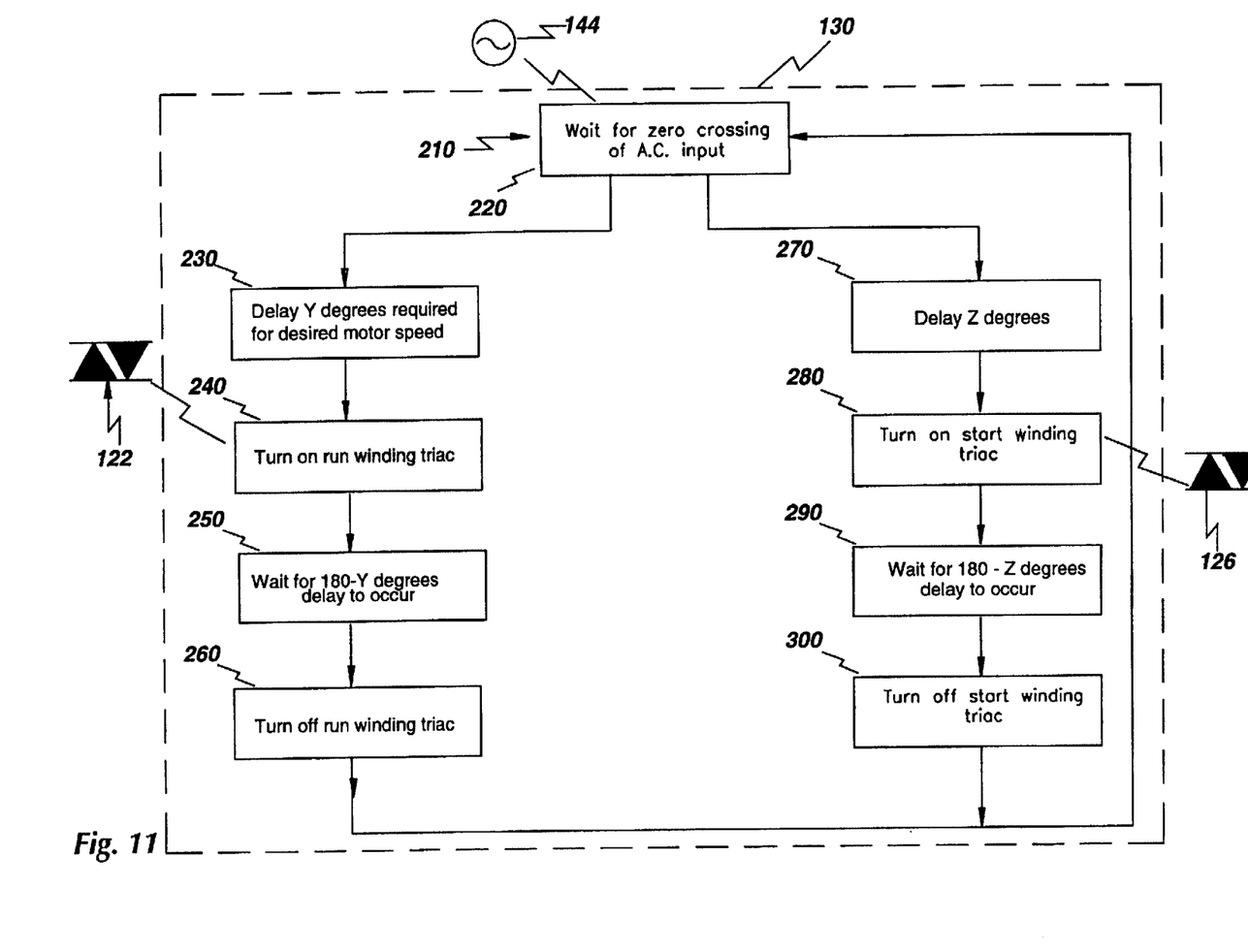
FIG. 11 is a flow chart illustrating a further variable speed mode sequence of the controller of the present invention.

FIG. 11 shows a flow chart of another variable speed sequence of the controller 130. The sequence 210 consists of a loop executed every half cycle of the AC input. The variable speed sequence 210 assumes the full speed mode sequence 160 is currently executing. The sequence 210 starts in a WAIT FOR ZERO CROSSING OF AC INPUT step 220. In this step, the controller 130 will monitor the AC input signal at its first input 136 (see FIG. 3). The controller will not advance to the next step until a zero crossing of the AC input 144 is detected. When the zero crossing point of the AC input 144 is detected, the controller 130 will then advance to the next step. At this point the sequence 210 splits into left and right branches as shown. The left branch will be executed simultaneously with the right branch in a time shared mode.

Referring to the left branch, a DELAY Y DEGREES REQUIRED FOR DESIRED MOTOR SPEED step 230 is executed. In this step, the run winding 114 is left de-energized for Y degrees from AC mains zero crossing. Next, a TURN ON RUN WINDING TRIAC step 240 is executed. This delay in energizing the run winding will weaken the magnetic field within the motor 112. After the run triac 122 is turned on, a WAIT FOR 180-Y DEGREES DELAY TO OCCUR step 250 is executed. After the delay, the controller 130 will then execute a TURN OFF RUN WINDING TRIAC step 260.

Referring to the right branch, a DELAY Z DEGREES step 270 will be executed when the zero crossing point of the AC input 144 is detected. At this step, the controller 130 will wait for Z degrees of the half cycle before advancing to the next step. After the delay, the controller 130 will then execute a TURN ON START WINDING TRIAC step 280. In this step, the start winding will be energized along with the already energized run winding 114. After the start triac 126 is turned on, a WAIT FOR 180-Z DEGREES DELAY TO OCCUR step 290 will be executed. After a 180-Z degree delay, a TURN OFF START WINDING TRIAC step 300 will be executed where the start triac 126 will be turned off. After the start triac 126 is turned off, the controller 130 will loop back to the beginning of the sequence 210.

Numerous modifications, variations and adaptations may be made to the particular embodiments of the invention described above without departing from the scope of the invention, which is defined in the claims.

What is claimed is:

1. An apparatus for controlling the speed of an induction motor, the motor having a first winding and a second winding which are adapted to be coupled to an AC source for supplying an AC input signal, the apparatus comprising:

a first switching device coupled to the first winding and a second switching device coupled to the second winding, each of the switching devices being operative in a low impedance state thereby enabling current to flow through the associated winding of each switching device and a high impedance state thereby preventing significant current flow through the associated winding of each switching device; and a controller means for switching each switching device between its high and low impedance states in a sequence for inducing a phase shift between voltage signals of the first winding and the second winding; the controller means controlling the operational speed of the induction motor in a variable speed mode, the variable speed mode being separate from a starting mode of the induction motor.

2. An apparatus as defined in claim 1, the controller means comprising an AC reference input.

3. An apparatus as defined in claim 2, the controller means comprising a second winding voltage reference input.

4. An apparatus as defined in claim 3, the controller means comprising a microcontroller.

5. An apparatus as defined in claim 4, the controller means comprising a user input/output means for defining the sequence.

6. An apparatus as defined in claim 1, the first and second switching devices comprising first and second respective triacs.

7. An apparatus as defined in claim 6, wherein the first triac is connected in series with the first winding and has a first gate input connected to the controller means, and the second triac is connected in series with the second winding and has a second gate input connected to the controller means.

8. An apparatus as defined in claim 7, the first switching device comprising a first optical coupler connected between the first gate input and the controller means, and the second switching device comprising a second optical coupler connected between the second gate input and the controller means.

9. An apparatus as defined in claim 1, wherein the phase shift is induced by initially switching the first switching device to its low impedance state at a first delay measured from a first zero crossing point of the AC input signal, then switching the second switching device to its low impedance state at a second delay measured from the first zero crossing point of the AC input signal, and then switching both the first and second switching devices to their high impedance states at a second zero crossing point of the AC input signal.

10. An apparatus as defined in claim 1, wherein the phase shift is induced by: switching the first switching device to its low impedance state at a first delay measured from a first zero crossing point of the AC input signal, and switching the second switching device to its low impedance state at a second delay measured from a zero crossing point of a voltage signal across the second winding; and then switching the first switching device to its high impedance state at a second zero crossing point of the AC input signal, and switching the second switching device to its high impedance state at a second zero crossing point of the voltage signal across the second winding.

11. An apparatus as defined in claim 10, wherein the first delay is zero degrees.

12. An apparatus as defined in claim 10, wherein the first delay is variable.

13. An apparatus as defined in claim 10, wherein the second delay is at least ninety degrees.

14. An apparatus as defined in claim 10, wherein the second delay is variable.

15. An apparatus as defined in claim 10, wherein the second zero crossing point of the AC input signal is the next zero crossing point of the AC input signal, and the second zero crossing point of the voltage signal across the second winding is the next zero crossing point of the voltage signal across the second winding.

16. A method for controlling the speed of an induction motor, the motor having a first winding and a second winding which are adapted to be coupled to an AC source for supplying an AC input signal, the method comprising the steps of:
   i. detecting a first zero crossing point of the AC input signal;
   ii. generating first and second delays measured from the first zero crossing point of the AC input signal;
   iii. after the first delay has occurred, switching on the first winding enabling current to flow through the first winding;
   iv. after the second delay has occurred, switching on the second winding enabling current to flow through the second winding;
   v. detecting a second zero crossing point of the AC input signal; and
   vi. switching off the first and the second windings thereby preventing significant current flow through the first and second windings; and wherein the steps as performed control the operational speed of the induction motor in a variable speed mode, the variable speed mode being separate from a starting mode of the induction motor.

17. A method for controlling the speed of an induction motor, the motor having a first winding and a second winding which are adapted to be coupled to an AC source for supplying an AC input signal, the method comprising the steps of:

I.
  a)
    i. detecting a first zero crossing point of the AC input signal;
    ii. generating a first delay; and
    iii. after the first delay has occurred, switching on the first winding enabling current to flow through the first winding; and simultaneously
  b)
    i. detecting a first zero crossing point of the voltage signal across the second winding;
    ii. generating a second delay; and
    iii. switching on the second winding enabling current to flow through the second winding; and then II.
  a)
    i. detecting a second zero crossing point of the AC input signal; and
    ii. switching off the first winding thereby preventing significant current flow through the first winding; and simultaneously
  b)
    i. detecting a second zero crossing point of the voltage signal across the second winding; and
    ii. switching off the second winding thereby preventing significant current flow through the second winding; and wherein the steps as performed control the operational speed of the induction motor in a variable speed mode, the variable speed mode being separate from a starting mode of the induction motor.

18. A method as defined in claim 17, wherein the first delay is zero degrees.

19. A method as defined in claim 17, wherein the first delay is variable.

20. A method as defined in claim 17, wherein the second delay is at least ninety degrees.

21. A method as defined in claim 17, wherein the second delay is variable.

22. A method as defined in claim 17, wherein the second zero crossing point of the AC input signal is the next zero crossing point of the AC input signal, and the second zero crossing point of the voltage signal across the second winding is the next zero crossing point of the voltage signal across the second winding.

* * * * *

UNITED STATES PATENT AND TRADEMARK OFFICE
CERTIFICATE OF CORRECTION

PATENT NO.   : 5,734,248
DATED        : March 31, 1998
INVENTOR(S)  : Kemp, et al.

It is certified that error appears in the above-identified patent and that said Letters Patent is hereby corrected as shown below:

On the title page, under item [56], insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 0 | 9 | 9 | 1 | 0 | 8 | July 4/78 | Okawa et al. | | | |
| | | 4 | 4 | 0 | 9 | 5 | 3 | 2 | Oct 11/83 | Hollenbeck et al. | | | |
| | | 4 | 4 | 3 | 1 | 9 | 5 | 8 | Feb 14/84 | Schutten et al. | | | |
| | | 4 | 4 | 5 | 9 | 5 | 3 | 2 | July 10/84 | Schutten et al. | | | |
| | | 4 | 4 | 8 | 1 | 7 | 8 | 6 | Nov 13/84 | Bashark | | | |
| | | 5 | 1 | 1 | 1 | 3 | 7 | 4 | May 5/92 | Lai et al. | | | |
| | | | | | | | | | | | | | |

Signed and Sealed this

Ninth Day of March, 1999

Attest:

Q. TODD DICKINSON

*Attesting Officer*          *Acting Commissioner of Patents and Trademarks*